(12) United States Patent
Kaler et al.

(10) Patent No.: US 7,836,489 B2
(45) Date of Patent: Nov. 16, 2010

(54) SELECTING POLICY FOR COMPATIBLE COMMUNICATION

(75) Inventors: Christopher G. Kaler, Sammamish, WA (US); Douglas A. Walter, Redmond, WA (US); Martin Gudgin, Chesire (GB)

(73) Assignee: Microsoft Corporation, Redmond, WA (US)

( * ) Notice: Subject to any disclaimer, the term of this patent is extended or adjusted under 35 U.S.C. 154(b) by 1021 days.

(21) Appl. No.: 11/424,415

(22) Filed: Jun. 15, 2006

(65) Prior Publication Data

US 2007/0294743 A1 Dec. 20, 2007

(51) Int. Cl.
*G06F 7/04* (2006.01)
*G06F 15/16* (2006.01)
*G06F 17/30* (2006.01)
*H04L 29/06* (2006.01)

(52) U.S. Cl. .......................................... 726/3
(58) Field of Classification Search ........................ 726/3
See application file for complete search history.

(56) References Cited

U.S. PATENT DOCUMENTS

| | | | |
|---|---|---|---|
| 7,591,000 B2* | 9/2009 | Griffin et al. | 726/1 |
| 2002/0051188 A1* | 5/2002 | Kim | 358/1.15 |
| 2003/0187817 A1* | 10/2003 | Agrawal et al. | 707/1 |
| 2004/0249910 A1* | 12/2004 | Jerbi et al. | 709/222 |
| 2006/0184636 A1* | 8/2006 | M. Kolavi | 709/209 |
| 2006/0206440 A1* | 9/2006 | Anderson et al. | 705/500 |
| 2007/0226807 A1* | 9/2007 | Ginter et al. | 726/27 |

* cited by examiner

*Primary Examiner*—Kambiz Zand
*Assistant Examiner*—Stephen Sanders
(74) *Attorney, Agent, or Firm*—Workman Nydegger

(57) ABSTRACT

The present invention extends to methods, systems, and computer program products for selecting policy for compatible communication. Hierarchical policy document data structures represent communication (e.g., security) aspects and options such that lower aspects and options are accessed in the context of corresponding higher aspects and options to define applicable scope. Use of a hierarchical description also facilitates separation of what is being protected from how it is being protected thereby allowing security policy to be considered at different locations of a description document.

20 Claims, 5 Drawing Sheets

| | Unsecured | Integrity Protected (Signed) | Confidential (Encrypted) |
|---|---|---|---|
| Service | ✓ | ✓ | |
| End Point | ✓ | ✓ | ✓ |
| Message | ✓ | | ✓ |
| Message Part | ✓ | ✓ | |

Table 200

| Cert. | |
|---|---|
| X.509 | kerb |
| ✓ | |

FIG. 2

SELECTING POLICY FOR COMPATIBLE COMMUNICATION

CROSS-REFERENCE TO RELATED APPLICATIONS

Not Applicable.

BACKGROUND

Background and Relevant Art

Computer systems and related technology affect many aspects of society Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, the performance of many computing tasks are distributed across a number of different computer systems and/or a number of different computing components.

In many networked environments, particularly on public networks, such as, for example, the Internet, it is often appropriate to use at least some form of security when computer systems communicate. For example, integrity protection (digital signing) can be used to ensure the authenticity of an entity sending communication. Similarly, confidentiality (encryption) can be used to prevent the communication from being meaningfully accessed. However, due to the different types and configurations of computer systems as well as various different types of integrity protection and confidentiality, computer systems in many environments can not natively communicate with one another using integrity protection or confidentiality.

For example, two computer systems may not support compatible security options. Further, when a computer system is compatible with multiple security options, the computer system may have no way to know what security options to use. As such, some mechanisms have been developed that allow computer systems to negotiate security options that will be used to facilitate a desired level of secure communication or at least to determine that desired level of secure communication is not possible.

Most, if not all, typical negotiations, include the comparison of entries in text based security information (e.g., a security file). Security information can include a set of rules that describe compatible security options for a computer system. When two computer systems desire to communicate with a desired level of security, the two computer systems compare security files. If rules in each file indicate commonly compatible security options for the desired level of security, the commonly compatible security options are used to implement secure communication between the two computer systems.

Text based security files represent different combinations of security options as entries in a flat list. That is, each entry in a security files identifies a combination of different security options. Unfortunately, using entries in a flat list can make it difficult to describe contextual aspects of security options. For example, it may be that a message is to be signed with a first security token that has a first attribute and also signed with a second security token that has a second attribute. However, representing this combination as an entry in a flat list can make describing the requirements and relationships between the tokens and the attributes difficult.

Further, a separate entry is typically needed for each varied combination of security options. For example, if communications options A, B, and C can be combined in various different ways with communication options X and Y, six different entries (XA, XB, XC, YA, YB, and YC) may be needed in a security file. As the number of different communications options and combinations of communications options increases, managing security files can become difficult. Some security file management mechanisms have utilized reference mechanisms (e.g., through a management language) to refer between different communication options and communication option combinations. However, such references can become arbitrarily nested adding further complexity Use of a flat list also typically forces integration of what is to be secured with how it is to be secured. That is, an entry has to indicate what message portions (e.g., message body and/or addressing information, etc.) are to be the subject of a corresponding combination of security options. If different combinations of security options are possible for a message portion, a separate entry is needed for each combination. Thus, comparison of security files can include comparing multiple entries for a specified message portion to attempt to identify a match. No context is maintained between entry comparisons. Thus, even if all but one option matches the match fails and a new entry is then compared.

BRIEF SUMMARY

The present invention extends to methods, systems, and computer program products for selecting policy for compatible communication. In some embodiments, a first hierarchical policy document corresponding to a computer system is accessed. The first hierarchal policy document is arranged in a hierarchical format to describe compatible combinations of communication options appropriate for communicating with the computer system, communication options higher in the hierarchical format providing context for related communication options lower in the hierarchical format. A second hierarchical policy document corresponding to another computer system is accessed. The second hierarchal policy document is arranged in a hierarchical format to describe compatible combinations of communication options appropriate for communicating with the other computer system, communication options higher in the hierarchical format providing context for related communication options lower in the hierarchical format.

A portion of the first hierarchical policy document is matched to corresponding portion of the second hierarchical policy document for a specified communication option. A second lower portion of the first hierarchical policy document is matched to a corresponding second lower portion of the second hierarchical policy document for a specified communication sub-option of the specified communication option in the context of the specified communication option. It is determined that compatible communication between the computer system and the other computer system is possible using the specified communication option along with the corresponding communication sub-option.

In other embodiments, a security intent for a computer system is accessed. The security intent indicates how communication with the computer system is to be secured. It is determining that another computer system is compatible with the security intent of the computer system. A security target for the computer system is accessed. The security target indicates what portion of communication with the computer system is to be secured. One or more security options compatible with both the computer system and the other computer system and that can be used to implement the security intent for the security target is identified.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates an example of another policy document data structure.

DETAILED DESCRIPTION

Figure 1:
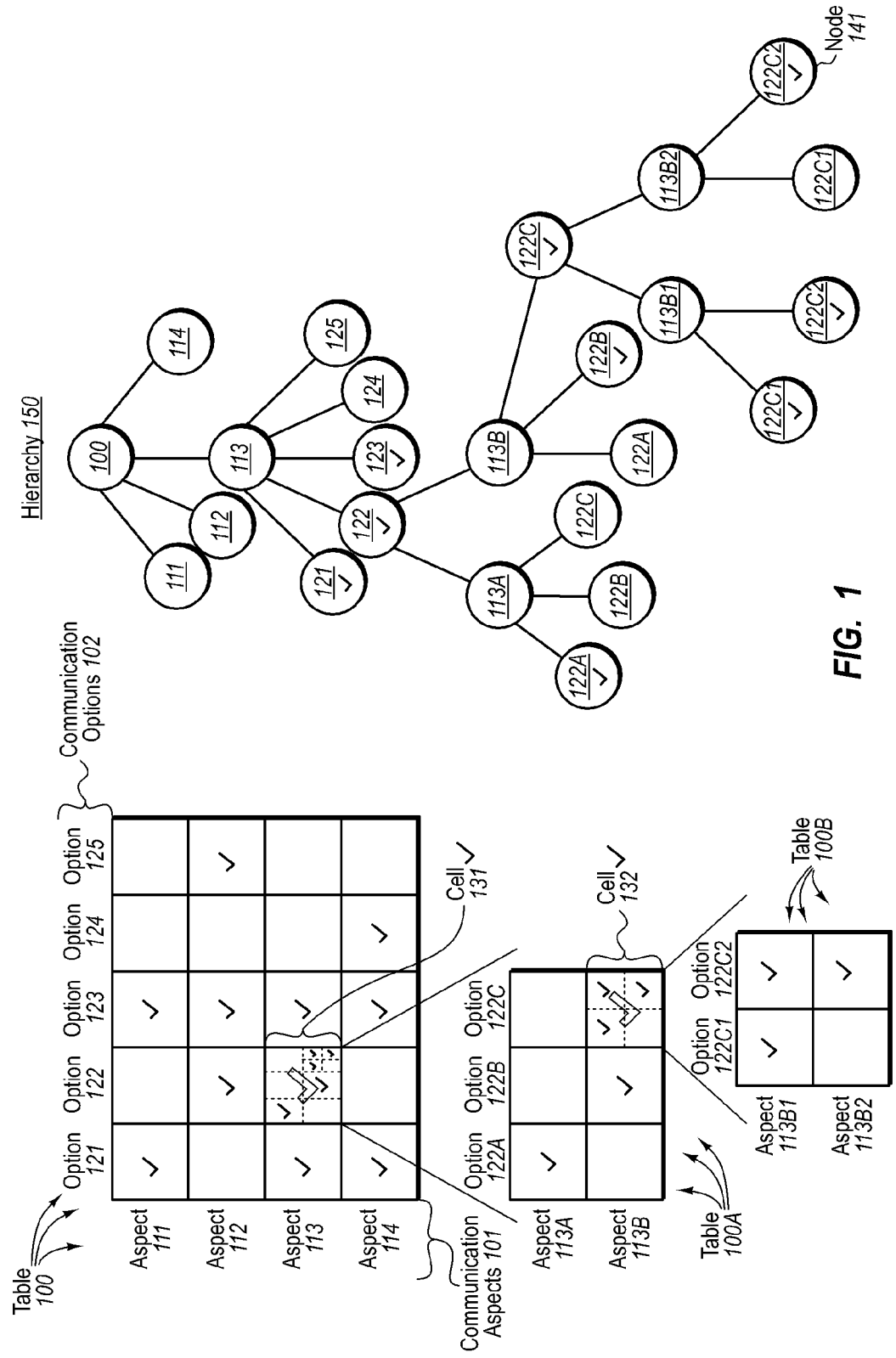
FIG. 1 illustrates an example of policy document data structures.

The present invention extends to methods, systems, and computer program products for selecting policy for compatible communication. In some embodiments, a first hierarchical policy document corresponding to a computer system is accessed. The first hierarchal policy document is arranged in a hierarchical format to describe compatible combinations of communication options appropriate for communicating with the computer system, communication options higher in the hierarchical format providing context for related communication options lower in the hierarchical format. A second hierarchical policy document corresponding to another computer system is accessed. The second hierarchal policy document is arranged in a hierarchical format to describe compatible combinations of communication options appropriate for communicating with the other computer system, communication options higher in the hierarchical format providing context for related communication options lower in the hierarchical format.

A portion of the first hierarchical policy document is matched to corresponding portion of the second hierarchical policy document for a specified communication option. A second lower portion of the first hierarchical policy document is matched to a corresponding second lower portion of the second hierarchical policy document for a specified communication sub-option of the specified communication option in the context of the specified communication option. It is determined that compatible communication between the computer system and the other computer system is possible using the specified communication option along with the corresponding communication sub-option.

In other embodiments, a security intent for a computer system is accessed. The security intent indicates how communication with the computer system is to be secured. It is determining that another computer system is compatible with the security intent of the computer system. A security target for the computer system is accessed. The security target indicates what portion of communication with the computer system is to be secured. One or more security options compatible with both the computer system and the other computer system and that can be used to implement the security intent for the security target is identified.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of policy document data structures 100 and 150. Table 100 depicts rows corresponding to communication aspects 111, 112, 113, and 114 (communication aspects 101) and columns corresponding to communication options 121, 122, 123, 124, 125 (communication options 102). Table 100, or other similar tables, can be associated with a computer system to indicate communication options (e.g., integrity protection (signing), confidentiality (encryption), etc.) that are supported for various different communication aspects (e.g., services, protocols, messages, custom data, Web services, etc). Generally, when table 100 includes a check mark in a specified cell, it indicates that a computer system can support the communication option for the corresponding communication aspect. For example, cell 131 can indicate that a computer system supports integrity protection (a communication option) for messages (a communication aspect).

Each cell in table 100 can also include a nested table that indicates corresponding sub-aspects and sub-options for the cell it is nested within. For example, table 100A is nested within cell 131. Aspects 113A and 113B can each represent different methods for performing integrity protection and options 122A, 122B, and 122C can indicate potential options associated with integrity protection. Generally, when table 100A includes a check mark in a specified cell, it indicates that a computer system can support the communication option for the corresponding communication aspect. A check mark can also indicate that further matching is needed within further nested tables.

Thus, three different states can occur within table 100. A first state (e.g., an unchecked cell) can indicate that an aspect/option combination is not supported. A second state (e.g., checked cell) can indicate that an aspect/option is supported. A third state, (e.g., a checked cell that includes nested tables) indicates further matching is needed to determine the extent of the support indicated in a checked cell.

A nested table can be used to refine the representation of supported communication options for various communication aspects with increased granularity in the context of the cell a table is nested within. As previously described, it may be that cell 131 indicates that a computer system supports integrity protection for messages. Thus, in the context of cell 131 (the cell table 100A is nested within), aspects 113A and 113B can represent different methods for performing integrity protection for messages (e.g., Kerberos and X.509). Likewise, options 122A, 122B, and 122C can indicate communications options (e.g., key type, key length, token attributes, etc.) that are supported for each of aspects 113A and 113B. For example, in the context of cell 131, cell 132 can indicate that a computer system supports a specific token attribute for X.509 based integrity protection.

Each cell in table 100A can also include a nested table that indicates corresponding sub-aspects and sub-options for the cell it is nested within. For example, table 100B is nested within cell 132. Aspects 113B1 and 113B2 can each represent an aspect of a token attribute and options 122C1 and 122C2 can indicate potential options associated with token attributes. Generally, when table 100B includes a check mark in a specified cell, it indicates that a computer system can support the communication option for the corresponding communication aspect.

As previously described, it may be that cell 132 (in the context of cell 131) indicates that a computer system supports integrity protection for messages using X.509 integrity protection. Thus, in the context of cell 132, aspects 113B1 and 113B2 can represent different token attribute aspects (e.g., freshness, reception from a specified token authority, etc). Likewise, 122C1 and 112C2 can indicate communications options (e.g., a freshness value, a token authority, etc.) that are supported for each of aspects 113A and 113B. For example, in the context of cell 131 and cell 132, table 100B can indicate that a computer system supports X.509 integrity protection for messages using tokens from token service 1 having a specified freshness value and using tokens from token service 2.

Although not expressly depicted, further nested tables can be nested within the cells of Table 100B. Further nested tables can be used to further refine the representation of supported communication options for various communication aspects with increased granularity in the context of other nested tables up to table 100.

Further, each of the other cells in Table 100 can also include one or more levels of nested tables to further refine the representation of supported communication options for various communication aspects with increased granularity, such as, for example, in the context of integrity protection for Web services, confidentiality for addressing information, etc. Thus, it may be that one or more communication aspects and communication options in table 100A are included in other nested tables to represent support for integrity protection in other contexts. It may even be that a table identical to table 100A is nested within a different cell of table 100 to indicate support for identical integrity protection aspects and options in another context.

An alternate way to visually represent a plurality of nested tables is in a hierarchy. For example, hierarchy 150 is a hierarchical representation of table 100. Table 100 is represented as a root node for hierarchy 150. Communication aspects 111, 112, 113, and 114 are child nodes of the root node. Options 121, 122, 123, 124, and 125 are child nodes of each communication aspect. However, for simplicity options 121, 122, 123, 124, and 125 are expressly depicted as child nodes of aspect 113. Further, child nodes can be used to represent communication aspects and communication options in nested tables. Childs nodes can be viewed in the context of the node in a spine form the child node to the root node.

Thus, depiction of aspects 113A and 113B as child nodes of option 122 is in the context of aspect 113 and root node 100. As a further example, node 141 representing option 122 is in the context of aspect 113B2, option 122C2, aspect 113B, option 122, aspect 113, and root node 100.

FIG. 2 illustrates an example of another policy document data structure 200. Table 200 represents that a computer system supports unsecured and integrity protection services, supports unsecured, integrity protected, and confidential endpoints, supports unsecured and confidential messages, and supports unsecured and integrity protected message parts. A nested sub-table indicates that message part integrity protection is supported for X.509 certificates but not for Kerberos.

In some embodiments, a description of supported communication aspects and options, such as, for example, security policy aspects and corresponding security policy options, are maintained in nested tables and/or hierarchical formats for each computer system in a plurality of computer systems. When computer systems determine if compatible (e.g., secure) communication is possible, appropriate portions of corresponding nested tables and/or hierarchical formats are compared. A match, for example, from a leaf node up to a root node, indicates that two computer systems support a communication (e.g., security) option within a specified communication (e.g., security) context.

A matching algorithm can be recursively applied to detect matches in each nested table. For example, referring briefly back to FIG. 1, an algorithm can be applied to identify a match between cell 131 and a cell of in another policy document table. The same algorithm can then be recursively applied to identify a match between cell 132 and a cell in a nested table (nested in the matching cell) of the other policy document table. Further recursion can be applied, for example, until matching leaf nodes are identified or subsequent comparison no longer identifies a match.

However, it should be understood that two policy document tables need not be identical for a match to be identified. For example, if one table includes options A, B, C and another table includes options C, D, E, a match can still be identified on option C. Further, through varied context at different levels of nesting in different policy document tables, matches can be identified at tables nested a different number of times. For example, an option in a doubly nested table in one policy document table can be matched to an option in a triply nested table in another policy document table when the contexts are appropriately similar.

Figure 3:
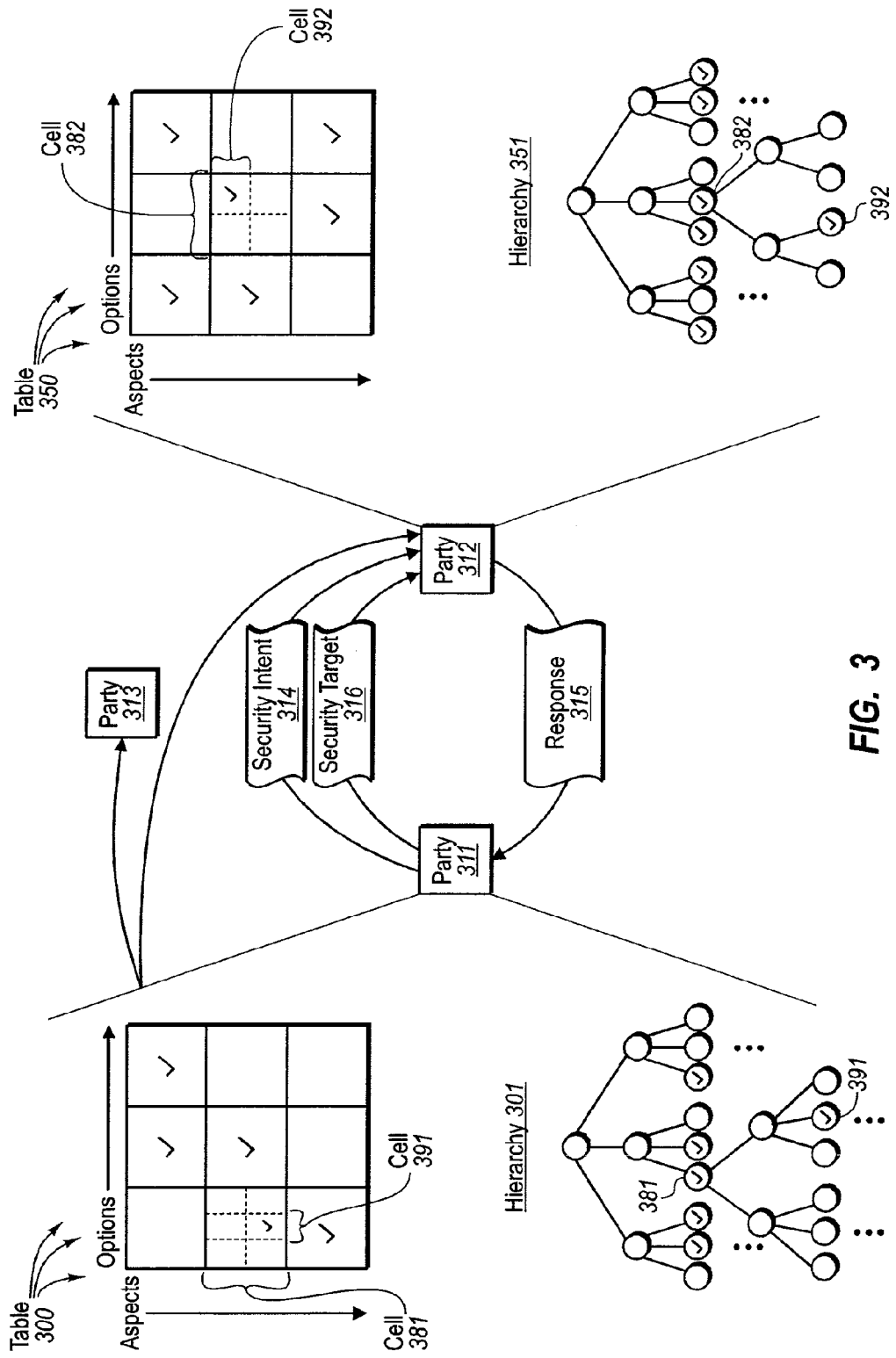
FIG. 3 illustrates an example computer architecture that facilitates selecting policy for compatible communication.

FIG. 3 illustrates example computer architecture 300 that facilitates selecting security policy for secure communication. Computer architecture 300 party 311, party 312, and party 313, each of which can be a computer system. Each of the parties 311, 312, and 313 can be connected to a network, such as, for example, a Local Area Network ("LAN"), a Wide Area Network ("WAN"), or even the Internet. Thus, the various components can receive data from and send data to each other, as well as other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Remote Desktop Protocol ("RDP"), Hypertext Transfer Protocol ("HTTP"), Simple Mail Transfer Protocol ("SMTP"), Simple Object Access Protocol "SOAP"), etc.) over the network.

As depicted, table 300 (and corresponding alternate view hierarchy 301) represents various supported communication aspects and communication options corresponding to party 311. Similarly, table 350 (and corresponding alternate view hierarchy 351) represents supported communication aspects and communication options corresponding to party 312. As depicted, compatible communication for party 311 and 312 can be negotiated through the exchange and comparison of (at least portions of) policy document data structures.

Figure 4:
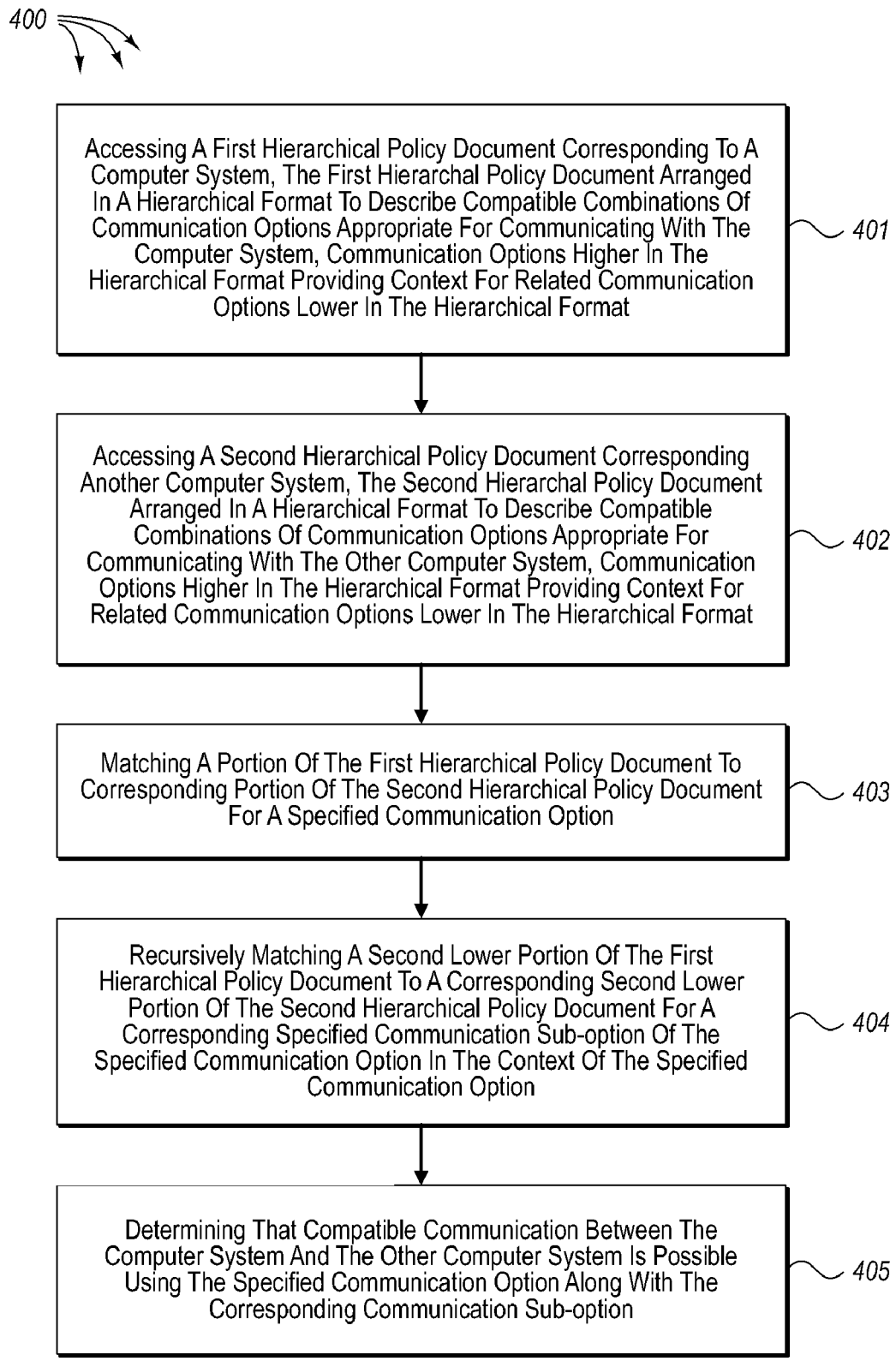
FIG. 4 illustrates a flow chart of an example method for selecting policy for compatible communication.

FIG. 4 illustrates a flow chart of an example method 400 for selecting policy for compatible communication. The method 400 will be described with respect to the components and data in computer architecture 300.

Method 400 includes an act of accessing a first hierarchical policy document corresponding to a computer system (act 401). The first hierarchal policy document arranged in a hierarchical format to describe compatible combinations of communication options appropriate for communicating with the computer system, communication options higher in the hierarchical format providing context for related communication options lower in the hierarchical format. For example, party 312 can access table 350 and/or hierarchy 351 corresponding to party 312. Alternately, party 313 (a third party) can access 350 and/or hierarchy 351 corresponding to party 312.

Method 400 includes an act of accessing a second hierarchical policy document corresponding to another computer system (act 402). The second hierarchal policy document arranged in a hierarchical format to describe compatible combinations of communication options appropriate for communicating with the other computer system, communication options higher in the hierarchical format providing context for related communication options lower in the hierarchical format. For example, party 312 can access table 300 and/or hierarchy 301 corresponding to party 311. Alternately, party 313 (a third party) can access 300 and/or hierarchy 301 corresponding to party 311.

In some embodiments, compatible communication aspects and options for sending communication from a computer system differ from compatible communication aspects and options for receiving communication at the computer system. Thus, when two computer systems negotiate communication (security) aspects/options, resulting compatible aspects/options can differ based on the direction of the communication. For example, sending may be more restrictive than receiving.

It may be that first and second computer systems negotiate compatible security options for communication. Resulting compatible aspects/options can indicate that when the first computer system is sending and a second computer system receiving, first compatible communication aspects/options are to be used. On the other hand, resulting compatible aspects/options can indicate that when the second computer system is sending and the first computer system is receiving, second different compatible communication aspects/options can be used. Accordingly, when appropriate, hierarchical policy documents can be configured to indicate different aspect/option combinations for sending and receiving.

Method 400 includes an act of matching a portion of the first hierarchical policy document to corresponding portion of the second hierarchical policy document for a specified communication option (act 403). For example, cell 381 can be matched to cell 382 indicating support by both party 311 and 312 for a specified communication option for a corresponding communication aspect. An appropriately configured matching algorithm can be applied at party 312, or alternately at party 313, to identify the match of cells 381 and 382.

Method 400 includes an act of recursively matching a second lower portion of the first hierarchical policy document to a corresponding second lower portion of the second hierarchical policy document for a corresponding specified communication sub-option of the specified communication option in the context of the specified communication option (act 404). For example, cell 391 in the context of cell 381 can be matched to cell 392 in the context of cell 382. The appropriately configured matching algorithm can be recursively applied (e.g., in the appropriate context for each hierarchical tree) at party 312, or alternatively at party 313, to identify the match between cells 391 and 392.

The appropriately configured matching algorithm can be further recursively applied to identify even more refined matches between cells in table 300/hierarchy 301 and cells in table 350/hierarchy 351 in other lower portions.

Method 400 includes an act of determining that compatible communication between the computer system and the other computer system is possible using the specified communication option along with the corresponding communication sub-option (act 405). For example, based on the match of cells 391 and 392 (and potentially on further matches in cells of lower portions of table 300/hierarchy 301 below cell 391 and cells in lower potions of table 350/hierarchy 351 below cell 392), party 312, or alternately party 313, can determine that compatible communication between party 311 and 312 is possible for a combination of communication aspects and corresponding communication options.

In some embodiments, a security intent is separated from a security target when determining if compatible communication is possible. For example, one party can transfer a security intent to another party indicating how communication is to be secured. Separately form the security intent, the one party can transfer a security target indicative of what portion of communication is to be secured.

Figure 5:
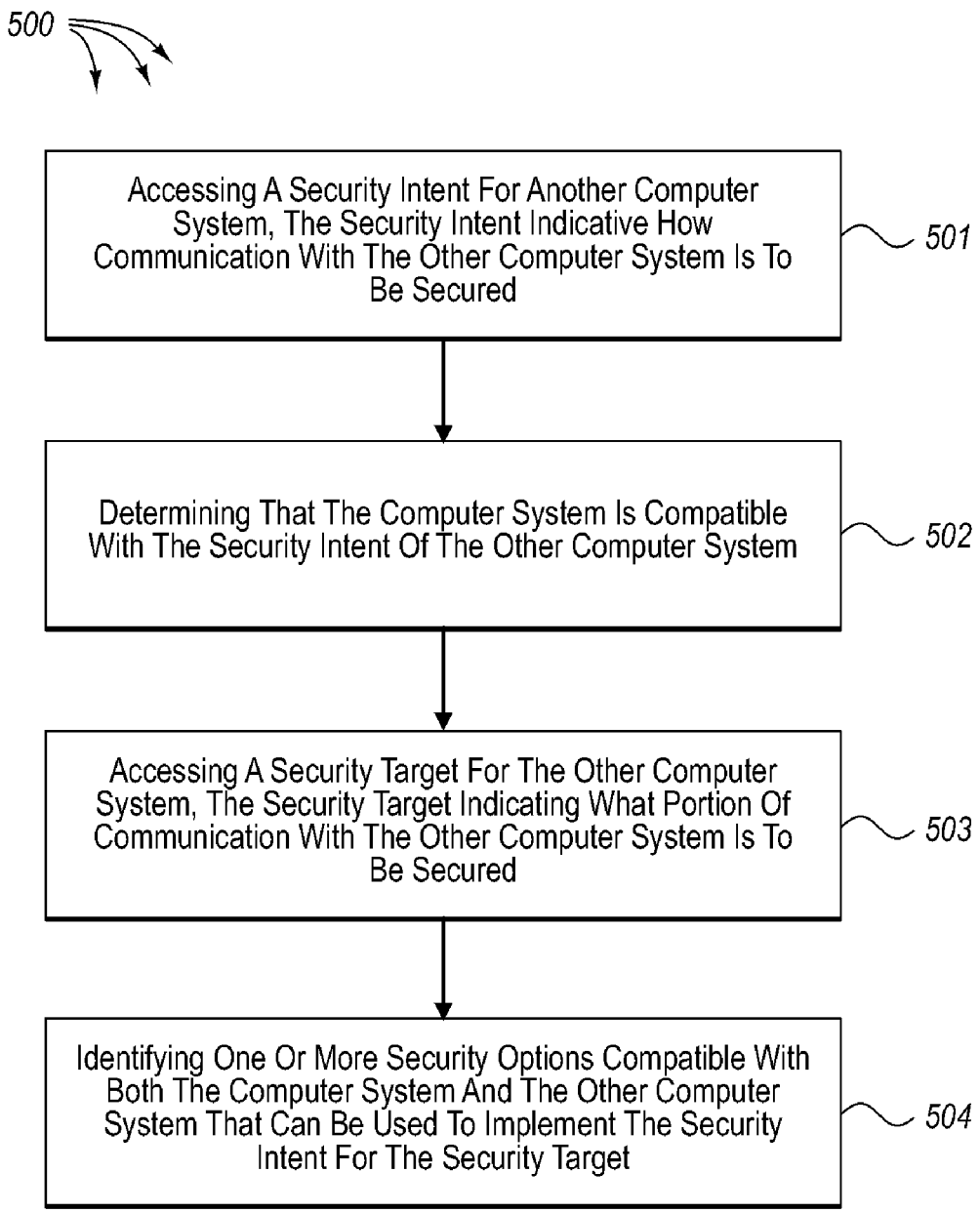
FIG. 5 illustrates a flow chart of an example method for selecting security policy for secure communication.

FIG. 5 illustrates a flow chart of another example method for selecting security policy for secure communication. The method 500 will be described with respect to the components and data in computer architecture 300.

Method 500 includes an act of accessing a security intent for the other computer system, the security intent indicative how communication with the other computer system is to be secured (act 501). For example, party 312 can access security intent 314 from party 311. Security intent 314 can indicate how communication between party 311 and party 312 is to be secured (e.g., integrity protection, confidentially, etc.). When appropriate, security intent 314 can include a portion of table 300/hierarchy 301 or a portion of some policy document data structure for party 311.

Method 500 includes an act of determining that the computer system is compatible with the security intent of the other computer system (act 502). For example, party 312 can determine that it is compatible with the security intent indicated in security intent 314. When appropriate, party 312 can compare security intern 314 to a portion of table 350/hierarchy 351 or a portion of some policy document data structure for party 312. Based on the comparison, party 312 can determine that it is compatible with security intent 314. Party 312 send response 315 to party 311 to indicate compatibility.

Method 500 includes an act of accessing a security target for the other computer system, the security target indicating what portion of communication with the other computer system is to be secured (act 503). For example, party 312 can access security target 316 from party 311. Security target 316 can indicate that a specified portion of communication (e.g., message bodies, addressing information, protocols, etc.) between party 311 and 312 is to be secured.

For example, security target 316 can include indicators, such as, for example, "integrity-protect-body", "confidentiality-protect-body", or "integrity-protect-addressing-information". Parameters can be included in indicators indicate protection for custom elements, such as, for example, "integrity-protect-custom (custom-part)". Thus, primary matching can occur on the ability to integrity protect custom elements. If both sides agree, then a parameter can be used to determine what to protect. It may also be that a secondary match is used to match for further support not indicated in an initial assertion.

Method 500 includes an act of identifying one or more security options compatible with both the computer system and the other computer system that can be used to implement the security intent for the security target (act 504). For example, party 312 can identify one or more security options compatible with both party 311 and party 312. When appropriate, party 312 can compare security target 314 to a portion of table 350/hierarchy 351 or a portion of some policy document data structure for party 312. Based on the comparison, party 312 can determine that it is compatible options for securing the security target 316 in accordance with security intern 314.

Alternately, party 313 can perform method 500 and relay determinations to parties 311 and 312.

In accordance with the present invention, security semantics associated with a policy can be formalized. As such, embodiments of the present invention can be used to describe security semantics associated with protocols (bindings) for secure m communication.

For example, an X.509 binding may be defined as supporting integrity projection using a digital certificate using the private key associated with a sender's X. 509 certificate and allowing confidentiality by encrypting data with an ephemeral key which is encrypted using the public key associated with the recipient's X.509 certificate. A policy, such as, for example "X509-Binding" can be used to indicate the defined functionality. In combination with "what" is to be secured, a resulting example policy statement may be:

Integrity-Protect-Body
Integrity-Protect-Addressing-Information
Confidentiality-Protect-Body
X509-Binding Given information in the example policy statement, partiers can determine what to expect and require for a message. Further, analysis of the protocol can be determined subject to the strengths and weaknesses of the binding parameters.

Bindings can also be multi-phased. For example, a protocol may indicate the X509-Binding is to be used for request and return of a session token. However, a session-binding is used to secure subsequent messages. For example:

First-Binding(Integrity-Protect-Body
Integrity-Protect-Addressing-Information
Confidentiality-Protect-Body
X509-Binding)
Second-Binding(Integrity-Protect-Body
Integrity-Protect-Addressing-Information
Confidentiality-Protect-Body
Session-Binding)

Alternately, the policy statement can be for example:
Integrity-Protect-Body
Integrity-Protect-Addressing-Information
Confidentiality-Protect-Body
X509-Binding-Followed-By-Session-Binding
or
Initial(Integrity-Protect-Body
Integrity-Protect-Addressing-Information
Confidentiality-Protect-Body
X509-Binding)
OnSessionCreate (Integrity-Protect-Body
Integrity-Protect-Addressing-Information
Confidentiality-Protect-Body
Session-Binding)

Other embodiments are also possible. For example, transitions can be event or parameter based.

Some parameters can be parameters that are used in comparisons to other parties to determine what is supported. Other parameters can be parameters that are not compared but provide information to a party. For example, support for a specific PID in an X.509 certificate is a parameter that can be matched. However, the issuer of a specific token may not be appropriate to match because it is specific to the target service.

Other examples of matching parameters are communication and protocol aspects that are "opt-in". For example, providing timestamp information in the header or using specialized sing/encrypt order. Generally, given a binding and parameters a party can determine what is to be done and how to structure a message. This allows parties to filter poorly formatted messages without expensive cryptographic processing.

Another type of parameter that can be match is security algorithms, such as, for example digest and canonicalization algorithms. In some embodiments security algorithms can be fixed by a protocol. However, in other embodiments a variety of security algorithms are supported. Algorithms can be presented as a collection, for example, a unique set of strongly typed algorithms, which is named and presented in policy. For example, the "Basic-AES" collection can indicate use of AES128 encryption, SHA1 digests, HMAC signatures, etc.

Policy can also indicate specific token types within specific usage classes. For example, a policy can indicate that Username tokens are used for sender authentication, X.509 certificates are used for message protection (and recipient authentication), and SAML tokes are used to supporting claims.

In some embodiments, policy can indicate additional legs are required. For example, in some embodiments, additional legs can indicate a security token service to contact, the action to use, and the parameters to specify in the request for security token ("RST") body of the message. This allows specific aspects of the token to be communicated by the target service to the issuer without requiring the requestor to understand (e.g., due to business relationships).

Thus, generally, embodiments of the present invention use a hierarchical description to describe security policy in a generalized expression framework. Advantageously, portions of security policy can be described in the context of other potions of security policy to describe applicable scope. Use of a hierarchical description can also facilitate separation of what is being protected from how it is being protected thereby allowing security policy to be considered at different locations of a description document.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computing system comprising a processor and a computer-readable media storing computer-executable instructions which, when executed by the processor, implement a method for selecting a compatible combination of communication options appropriate for communicating with another computer system, the method comprising:

an act of accessing a first hierarchical policy document corresponding to the computer system, the first hierarchal policy document arranged in a hierarchical format that includes a node for representing each of a first plurality of communication aspects including at least some of a service, a protocol, an endpoint, a message, a message part, an addressing-information, and a web services aspect, a plurality of sub-nodes of each node for representing each of a plurality of communication options, the communication options including an integrity protected option and a confidential option, wherein each sub-node includes an indication of whether the corresponding communication option is supported for the associated communication aspect, and at least one sub-node of a sub-node for representing a sub-option of the corresponding communication option, wherein the at least one sub-node of the sub-node also includes an indication of whether the corresponding sub-option is supported for the associated communication aspect, such that the first hierarchical policy document describes compatible combinations of communication options appropriate for communicating with the computer system;

an act of accessing a second hierarchical policy document corresponding to the other computer system, the second hierarchal policy document arranged in a hierarchical format that includes a node for representing each of a second plurality of communication aspects including at least some of a service, a protocol, an endpoint, a message, a message part, an addressing-information, and a web services aspect, a plurality of sub-nodes of each node for representing each of a plurality of communication options, the communication options including an integrity protected option and a confidential option, wherein each sub-node includes an indication of whether the corresponding communication option is supported for the associated communication aspect, and at least one sub-node of a sub-node for representing a sub-option of the corresponding communication option, wherein the at least one sub-node of the sub-node also includes an indication of whether the corresponding sub-option is supported for the associated communication aspect, such that the second hierarchical policy document describes compatible combinations of communication options appropriate for communicating with the other computer system;

an act of matching a sub-node of the first hierarchical policy document to a corresponding sub-node of the second hierarchical policy document for at least one compatible communication option that is supported for the associated communication aspect;

an act of recursively matching a sub-node of a sub-node of the first hierarchical policy document to a corresponding sub-node of a sub-node of the second hierarchical policy document for at least one corresponding compatible communication sub-option of the at least one compatible communication option that is supported for the associated communication aspect; and an act of determining that compatible communication between the computer system and the other computer system is possible using the at least one compatible communication option along with the corresponding compatible communication sub-option.

2. The method as recited in claim 1, wherein the act of matching a sub-node of the first hierarchical policy document to a corresponding sub-node of the second hierarchical policy document for at least one compatible communication option that is supported for the associated communication aspect comprises an act of matching a portion of a security policy for the computer system to a corresponding portion of security policy for the other computer system.

3. The method as recited in claim 1, wherein the act of matching a portion of a security policy for the computer system to a corresponding portion of security policy for the other computer system comprises an act of matching a portion of at least one of an integrity-protection policy and confidentiality policy for the computer system to a corresponding portion of security policy for the other computer system.

4. The method as recited in claim 1, wherein the act of recursively matching a sub-node of a sub-node of the first hierarchical policy document to a corresponding sub-node of a sub-node of the second hierarchical policy document comprises an act of matching an integrity projection sub-option in the context of integrity protection for a specified portion of communication selected from among a service, a protocol, a message, a message part, addressing information, and an end-point.

5. The method as recited in claim 1, wherein the act of recursively matching a sub-node of a sub-node of the first hierarchical policy document to a corresponding sub-node of a sub-node of the second hierarchical policy document comprises an act of matching a confidentiality sub-option in the context of confidentiality for a specified portion of communication selected from among a service, a protocol, a message, a message part, addressing information, and an end-point.

6. The method as recited in claim 1, wherein the act of determining that compatible communication between the computer system and the other computer system is possible comprises an act of detecting appropriate matches between the first hierarchical policy document and the second hierarchical policy document up a spine from a leaf node to a root node at each of the first hierarchical policy document and the second hierarchical policy document.

7. The method as recited in claim 1, wherein the second hierarchical policy document is sent by the other computer system to the computer system where the first and second hierarchical policy documents are compared.

8. The method as recited in claim 1, wherein the sub-option comprises one of Kerberos or X.509 for performing integrity protection of messages communicated between the computer system and the other computer system.

9. The method as recited in claim 1, wherein the first and second hierarchical policy documents are tables, wherein the nodes correspond to rows in the tables and the sub-nodes correspond to columns in the table, and wherein the sub-nodes of the sub-nodes correspond to nested tables within a cell of the table.

10. The method as recited in claim 1, wherein the first or second hierarchical policy documents specifies that a first communication sub-option is to be applied to a first communication between the computer system and the other computer system, whereas a second communication sub-option is to be applied to subsequent communications.

11. One or more computer-readable storage media storing computer-executable instructions which, when executed by the processor, implement a method for selecting a compatible combination of communication options appropriate for communicating with another computer system, the method comprising:

an act of accessing a first hierarchical policy document corresponding to the computer system, the first hierarchal policy document arranged in a hierarchical format that includes a node for representing each of a first plurality of communication aspects including at least some of a service, a protocol, an endpoint, a message, a message part, an addressing-information, and a web services aspect, a plurality of sub-nodes of each node for representing each of a plurality of communication options, the communication options including an integrity protected option and a confidential option, wherein each sub-node includes an indication of whether the corresponding communication option is supported for the associated communication aspect, and at least one sub-node of a sub-node for representing a sub-option of the corresponding communication option, wherein the at least one sub-node of the sub-node also includes an indication of whether the corresponding sub-option is supported for the associated communication aspect, such that the first hierarchical policy document describes compatible combinations of communication options appropriate for communicating with the computer system;

an act of accessing a second hierarchical policy document corresponding to the other computer system, the second hierarchal policy document arranged in a hierarchical format that includes a node for representing each of a second plurality of communication aspects including at least some of a service, a protocol, an endpoint, a message, a message part, an addressing-information, and a web services aspect, a plurality of sub-nodes of each node for representing each of a plurality of communication options, the communication options including an integrity protected option and a confidential option, wherein each sub-node includes an indication of whether the corresponding communication option is supported for the associated communication aspect, and at least one sub-node of a sub-node for representing a sub-option of the corresponding communication option, wherein the at least one sub-node of the sub-node also includes an indication of whether the corresponding sub-option is supported for the associated communication aspect, such that the second hierarchical policy document describes compatible combinations of communication options appropriate for communicating with the other computer system;

an act of matching a sub-node of the first hierarchical policy document to a corresponding sub-node of the second hierarchical policy document for at least one compatible communication option that is supported for the associated communication aspect;

an act of recursively matching a sub-node of a sub-node of the first hierarchical policy document to a corresponding sub-node of a sub-node of the second hierarchical policy document for at least one corresponding compatible communication sub-option of the at least one compatible communication option that is supported for the associated communication aspect; and an act of determining that compatible communication between the computer system and the other computer system is possible using the at least one compatible communication option along with the corresponding compatible communication sub-option.

12. The one or more computer-readable storage media as recited in claim 11, wherein the act of matching a sub-node of the first hierarchical policy document to a corresponding sub-node of the second hierarchical policy document for at least one compatible communication option that is supported for the associated communication aspect comprises an act of matching a portion of a security policy for the computer system to a corresponding portion of security policy for the other computer system.

13. The one or more computer-readable storage media as recited in claim 11, wherein the act of matching a portion of a security policy for the computer system to a corresponding portion of security policy for the other computer system comprises an act of matching a portion of at least one of an integrity-protection policy and confidentiality policy for the computer system to a corresponding portion of security policy for the other computer system.

14. The one or more computer-readable storage media as recited in claim 11, wherein the act of recursively matching a sub-node of a sub-node of the first hierarchical policy document to a corresponding sub-node of a sub-node of the second hierarchical policy document comprises an act of matching an integrity projection sub-option in the context of integrity protection for a specified portion of communication selected from among a service, a protocol, a message, a message part, addressing information, and an end-point.

15. The one or more computer-readable storage media as recited in claim 11, wherein the act of recursively matching a sub-node of a sub-node of the first hierarchical policy document to a corresponding sub-node of a sub-node of the second hierarchical policy document comprises an act of matching a confidentiality sub-option in the context of confidentiality for a specified portion of communication selected from among a service, a protocol, a message, a message part, addressing information, and an end-point.

16. The one or more computer-readable storage media as recited in claim 11, wherein the act of determining that compatible communication between the computer system and the other computer system is possible comprises an act of detecting appropriate matches between the first hierarchical policy document and the second hierarchical policy document up a spine from a leaf node to a root node at each of the first hierarchical policy document and the second hierarchical policy document.

17. The one or more computer-readable storage media as recited in claim 11, wherein the second hierarchical policy document is sent by the other computer system to the computer system where the first and second hierarchical policy documents are compared.

18. The one or more computer-readable storage media as recited in claim 11, wherein the sub-option comprises one of Kerberos or X.509 for performing integrity protection of messages communicated between the computer system and the other computer system.

19. The one or more computer-readable storage media as recited in claim 11, wherein the first and second hierarchical policy documents are tables, wherein the nodes correspond to rows in the tables and the sub-nodes correspond to columns in the table, and wherein the sub-nodes of the sub-nodes correspond to nested tables within a cell of the table.

20. The one or more computer-readable storage media as recited in claim 11, wherein the first or second hierarchical policy documents specifies that a first communication sub-option is to be applied to a first communication between the computer system and the other computer system, whereas a second communication sub-option is to be applied to subsequent communications.

* * * * *